US010503373B2

(12) United States Patent
Schwesig et al.

(10) Patent No.: US 10,503,373 B2
(45) Date of Patent: Dec. 10, 2019

(54) VISUAL FEEDBACK FOR HIGHLIGHT-DRIVEN GESTURE USER INTERFACES

(75) Inventors: Carsten Schwesig, San Francisco, CA (US); Marvin Demerchant, San Diego, CA (US); Steven Friedlander, San Diego, CA (US); Brian Johnson, San Francisco, CA (US); Sebrina Yeh, Laguna Beach, CA (US); Hyehoon Yi, Escondido, CA (US); David Young, San Diego, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 204 days.

(21) Appl. No.: 13/420,275

(22) Filed: Mar. 14, 2012

(65) Prior Publication Data

US 2013/0246955 A1 Sep. 19, 2013

(51) Int. Cl.
*G06F 3/0484* (2013.01)
*G06F 3/01* (2006.01)
*G06F 3/03* (2006.01)
*G06F 3/0482* (2013.01)

(52) U.S. Cl.
CPC .......... *G06F 3/04842* (2013.01); *G06F 3/017* (2013.01); *G06F 3/0304* (2013.01); *G06F 3/0482* (2013.01)

(58) Field of Classification Search
CPC ..... G06F 3/017; G06F 3/0482; G06F 3/04842
USPC ....................................... 715/767, 845, 863
See application file for complete search history.

(56) References Cited

U.S. PATENT DOCUMENTS

| 6,587,131 | B1* | 7/2003 | Nakai et al. ................... 715/857 |
| 9,081,479 | B1* | 7/2015 | Fram ..................... G06F 3/0236 |
| 2002/0186200 | A1* | 12/2002 | Green ........................... 345/156 |
| 2004/0001041 | A1* | 1/2004 | Chang et al. .................. 345/156 |
| 2004/0189802 | A1* | 9/2004 | Flannery ....................... 348/143 |
| 2006/0209021 | A1* | 9/2006 | Yoo et al. ...................... 345/156 |
| 2008/0229248 | A1* | 9/2008 | Fagans et al. ................ 715/838 |
| 2008/0303803 | A1* | 12/2008 | O'Brien ................ G06F 3/0481 345/184 |
| 2009/0006353 | A1* | 1/2009 | Vignoli et al. .................... 707/5 |

(Continued)

OTHER PUBLICATIONS

Fabrizio Pilato Touchless Gesture User Interface to be Demo'd IFA Aug. 24, 2010 4 pages.*

(Continued)

*Primary Examiner* — Andrea N Long
(74) *Attorney, Agent, or Firm* — Trellis IP Law Group, PC (57) ABSTRACT

Disclosed are approaches for user interface control. In one embodiment, a method can include: indicating a highlight of a first object of a plurality of objects displayed on a display screen; accepting a signal deriving from a first gesture input of a user indicating a neutral position relative to the highlighted first object; accepting a signal deriving from a second gesture input of the user indicating a directional position at least a predetermined distance from the neutral position; and indicating, in response to the second gesture input, a movement of the highlight from the first object to a second object adjacent to the first object, and where the directional position of the second gesture input correlates to a position on the display screen of the second object relative to the first object.

18 Claims, 8 Drawing Sheets

(56) References Cited

U.S. PATENT DOCUMENTS

| | | | |
|---|---|---|---|
| 2009/0021475 A1* | 1/2009 | Steinle et al. | 345/156 |
| 2009/0027337 A1* | 1/2009 | Hildreth | G06F 3/011 345/158 |
| 2009/0153288 A1* | 6/2009 | Hope et al. | 340/3.1 |
| 2009/0160778 A1* | 6/2009 | Nurmi et al. | 345/173 |
| 2009/0187860 A1* | 7/2009 | Fleck | G06F 3/0482 715/834 |
| 2009/0217211 A1 | 8/2009 | Hildreth | |
| 2009/0228841 A1* | 9/2009 | Hildreth | G06F 3/0304 715/863 |
| 2009/0315740 A1* | 12/2009 | Hildreth et al. | 341/20 |
| 2009/0327955 A1* | 12/2009 | Mouilleseaux | G06F 3/04812 715/810 |
| 2010/0058182 A1* | 3/2010 | Jung | 715/702 |
| 2010/0103178 A1* | 4/2010 | Song et al. | G06F 3/03542 345/473 |
| 2010/0229125 A1* | 9/2010 | Cha | 715/828 |
| 2010/0321289 A1 | 12/2010 | Kim | |
| 2011/0018804 A1* | 1/2011 | Homma et al. | 345/158 |
| 2011/0026765 A1* | 2/2011 | Ivanich et al. | 382/103 |
| 2011/0080490 A1* | 4/2011 | Clarkson et al. | 348/222.1 |
| 2011/0219340 A1 | 9/2011 | Pathangay | |
| 2011/0299737 A1* | 12/2011 | Wang et al. | 382/107 |
| 2012/0017147 A1* | 1/2012 | Mark | 715/702 |
| 2012/0069168 A1* | 3/2012 | Huang et al. | 348/77 |
| 2012/0200494 A1* | 8/2012 | Perski et al. | 345/156 |
| 2013/0027290 A1* | 1/2013 | Wong et al. | 345/156 |
| 2013/0111360 A1* | 5/2013 | Kodama et al. | 715/753 |
| 2013/0263036 A1* | 10/2013 | Berenson et al. | 715/773 |

OTHER PUBLICATIONS

C. Villamor, D. Willis, and I. Wroblewski Touch Gesture Reference Guide Apr. 15, 2010 7 pages.*

E. Artinger, T. Coskun, M. Schanzenbach, F. Echtler, S. Nestler, and G. Klinker. Exploring multi-touch gestures for map interaction in mass casualty incidents. In 3. Workshop zur IT-Unterstuetzung von Rettungskraeften im Rahmen der GI-Jahrestagung lnformatik 2011, Berlin, Germany, Oct. 2011.*

H. Choi, S. Chung, T. Crimm, J. Oh, M. Sencenbaugh CS247 Project 3: Gesture Controller Jan. 26, 2012 7 pages.*

Lin E; Cassidy A. et al.; "Hand Tracking using Spatial Gesture Modeling and Visual Feedback for a Virtual DJ System"; 2002; http://ieeexplore.ieee.org/xpl/freeabs_all.jsp?arnumber=1166992.

* cited by examiner

VISUAL FEEDBACK FOR HIGHLIGHT-DRIVEN GESTURE USER INTERFACES

BACKGROUND

In a free cursor type of user interface (UI), user input is mapped to a cursor position in a 2D or 3D screen space. The classic example for this type of user interface is the mouse-driven WIMP (Window, Icon, Menu, Pointer) UI that is commonly used in desktop or laptop computers.

In a highlight-driven type of UI, user input is mapped to the directional movement of a highlight in the screen space. One example of this approach is a remote control that is used to select a television program from a highlight driven navigation of a program menu. Also, game consoles, such as the Sony PlayStation 3, typically employ this method for system-level navigation systems.

SUMMARY

In particular embodiments, gesture input may be used to control a highlight-driven user interface.

In one embodiment, a method can include: indicating a highlight of a first object on a display screen, where the first object is one of a plurality of objects displayed on the display screen; accepting, by a computing device, a signal deriving from a first gesture input of a user, where the first gesture input indicates a neutral position relative to the highlighted first object on the display screen; accepting, by the computing device, a signal deriving from a second gesture input of the user, where the second gesture input indicates a directional position that is at least a predetermined distance from the neutral position; and indicating, in response to the second gesture input, a movement of the highlight from the first object to a second object, where the second object is adjacent to the first object in the plurality of objects on the display screen, and where the directional position of the second gesture input correlates to a position on the display screen of the second object relative to the first object.

A further understanding of the nature and the advantages of particular embodiments disclosed herein may be realized by reference of the remaining portions of the specification and the attached drawings.

DETAILED DESCRIPTION OF EMBODIMENTS

In particular embodiments, gesture input may be used in controlling a highlight-driven user interface. Gestures from a user may be recognized by a user input and/or computing device for control of a highlight-driven user interface. A display screen may be used to display a plurality of objects, which may each represent media content (e.g., a movie, audio clip, etc.) for selection by the user. For example, hand gestures from the user may be recognized to accommodate adjacent object navigation on the display screen.

Figure 1:
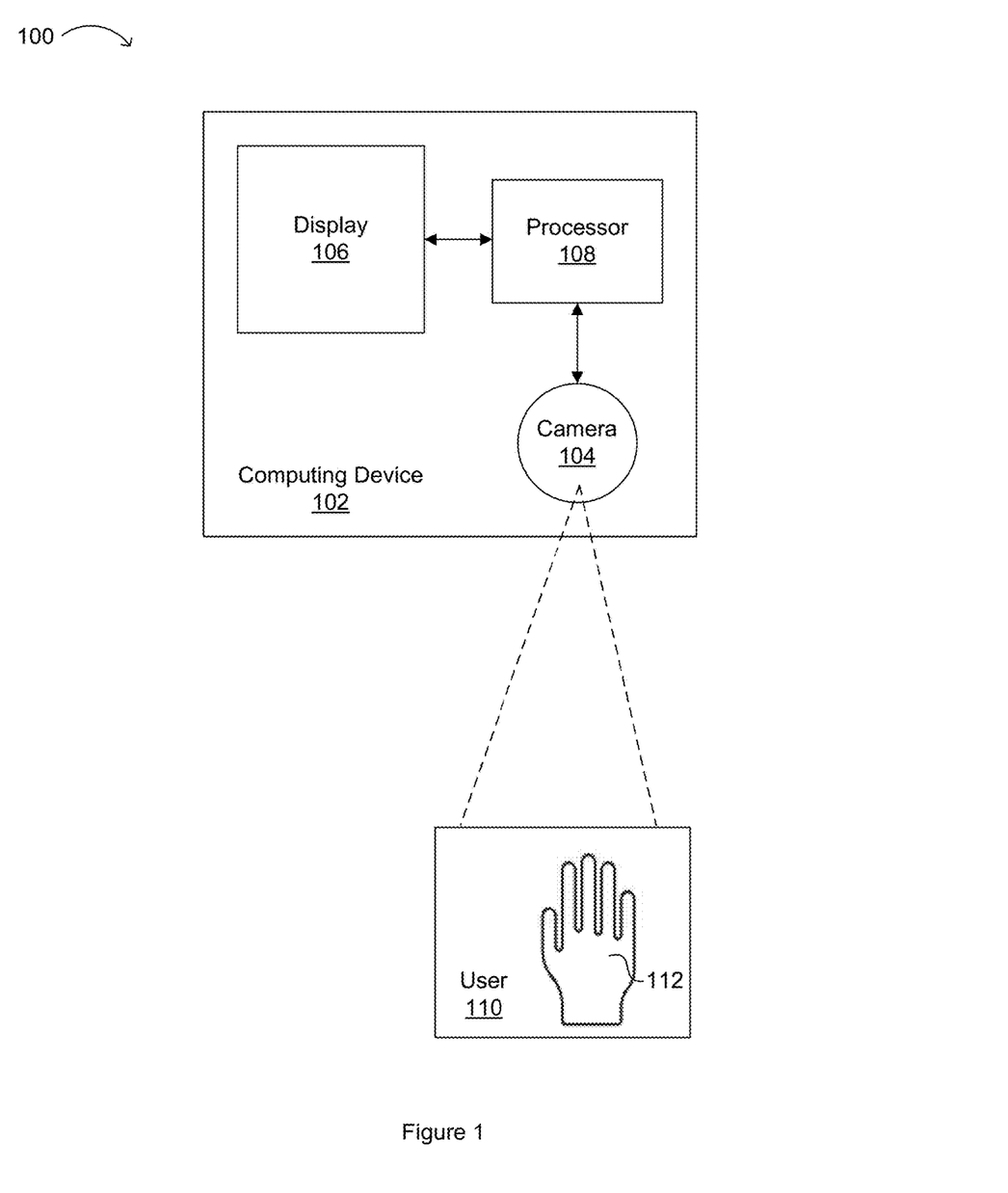
FIG. 1 depicts an example system arrangement for detecting gestures and controlling a highlight-driven user interface.

Referring now to FIG. 1, shown is an example system arrangement 100 for detecting gestures and controlling a highlight-driven user interface. For example, system arrangement 100 can include computing device 102 with visual display 106, and a mechanism for detecting gestures. In one example, camera 104 along with processor 108 (e.g., any general purpose processor, central processing unit (CPU), microcontroller, etc.) may be used to detect gestures from user 110. Signals may be derived from gestures recognized from user 110. Thus, camera 104 may receive visual gesture inputs, and signals may be derived therefrom to represent these gestures.

Gestures may include human gestures, such as those not requiring an input device. For example, a user's hand 112 may be positioned, arranged, and/or moved within the detection range of camera 104 and computing device 102. Alternatively, input-device based gestures, such as those utilizing the PlayStation Move device, Wii device, or other devices which measure position/and or displacement in 2D or 3D space.

Particular embodiments are suitable to user input device (e.g., a remote that uses a gyroscope and is held in the hand) type of gesturing, and/or gesturing in free space that does not require a remote or other user input device that touches the hand of the user. Particular embodiments may accommodate any type of gesture recognition and/or acquisition, whereby such gestures may be mapped to a user interface. Further, particular embodiments are suitable to highlight-driven user interfaces. For example, a mouse may be more feasible to a free cursor type of user interface, however even this type of user input device may also be utilized in a highlight-driven user interface if the mouse were configured to click on something to provide a highlight an object, and control references were made relative to the highlighted object.

Certain embodiments may also include an initialization gesture, such as moving the hand in FIG. 8 or infinity pattern. The initialization process can be recognized by computing device 102 in order to ready the system for subsequent gestures (e.g., based on hand 112) from user 110. As will be discussed in more detail below, particular embodiments allow for highlighting of boxes, items, or "objects" on display screen 106. Such objects can then be navigated by highlighting an adjacent or sequential object using gestures (e.g., a directional position of a hand gesture). Also, the speed of such highlight-based navigation may be adjusted based on a distance of the hand gesture position relative to a neutral position. Particular embodiments are directed to a position mapping of a user's hand position to a highlighted object or subset of a user interface or display, as opposed to a mapping to an entire interface/display.

Figure 2:
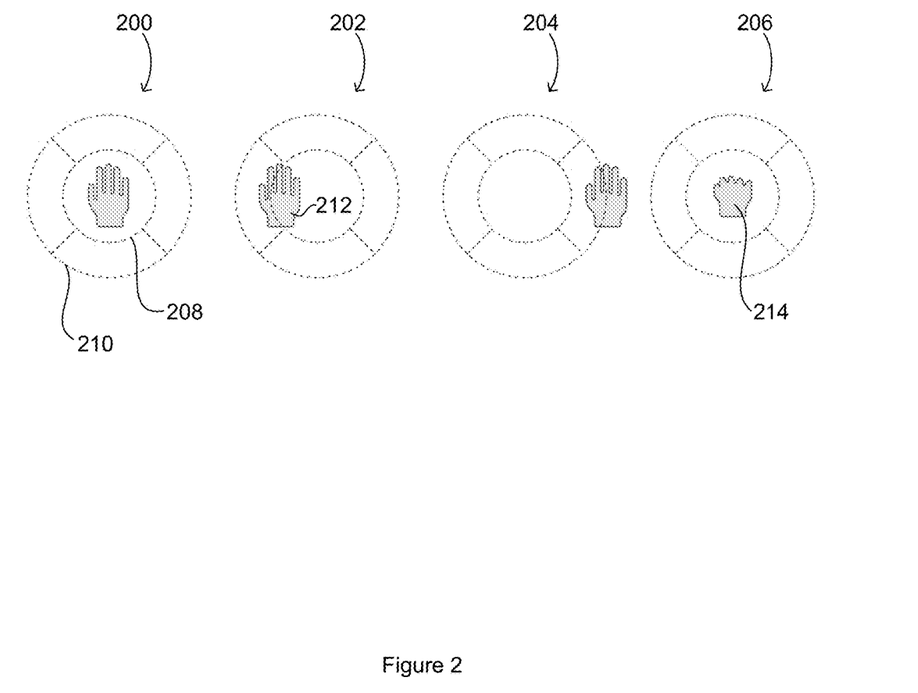
FIG. 2 depicts example gesture recognition by mapping hand position to center, direction, and distance.

Referring now to FIG. 2, shown is an example of gesture recognition by mapping hand position to center, direction, and distance. Conventional free-cursor user interfaces for gesture input include those whereby hand/device gesture input is mapped to a cursor position, and not to directional movement of a highlight. Also, visual feedback may be mapped to a 2D position in relation to the whole screen display. Examples of such free-cursor gesture-based user interfaces include Nintendo Wii, PlayStation Move, Kinect, Gyro-based pointing devices.

However, particular embodiments involve gesture input that may be mapped to directional input. Thus, instead of measuring hand/device position as X/Y coordinates, the system may utilize an angle and distance of the current position in relation to a center point that indicates a neutral position. For example, a hand position above the center point may be interpreted as directional "up" input, thus moving the highlight vertically. Further, the distance of the hand position from the center point can be mapped to a speed of highlight movement, thus moving the hand higher above the center point can cause the highlight to move faster.

In example 200, hand representation 212 may be recognized as in a neutral position inside inner 208 and outer 210 concentric rings or thresholds around the neutral position. In example 202, the gesture input may be recognized as a left directional position of hand 212 that reaches inner ring 208. In example 204, the gesture input may be recognized as a right directional position of hand 212 that reaches outer ring 210. In particular embodiments, movement of the highlight may be performed at a faster speed if the directional position meets or exceeds outer concentric ring 210, as opposed to only reaching inner ring 208.

In this fashion, directional position of a hand gesture relative to a neutral position can be used to control a user interface selection. Thus, the example of 202 can result in a movement of a highlight from a present object to an object that is adjacent thereto on the left side. The example of 204 may result in movement of the highlight from the present object to an object that is adjacent thereto on the right side. In addition, if the hand remains substantially in the positions as shown in these examples, the highlights may continue to move to adjacent objects in sequential or scroll through fashion, albeit at different rates (e.g., relatively slow in example 202, and relatively fast in example 204).

In example 206, a grab or grasp gesture recognition is shown 214, and this gesture can be interpreted as selecting a highlighted object. For example, if objects represent movie or video media content, such grasping can control playing or accessing of the highlighted video content. Also, while these example gestures are shown, particular embodiments are suitable to any type of interpretable or recognizable gestures. For example, instead of a grasp for selection, maintaining a hand in a given position for a predetermined amount of time may be interpreted as a selection. As another example, a finger point, or a turning gesture, such as turning a doorknob, may be interpreted as a selection. Further, if computing device 102 and/or system arrangement 100 allows for a larger range of movement, other body parts, arm/hand, legs, and/or body positioning, may be utilized to control a user interface in particular embodiments.

Figure 3:
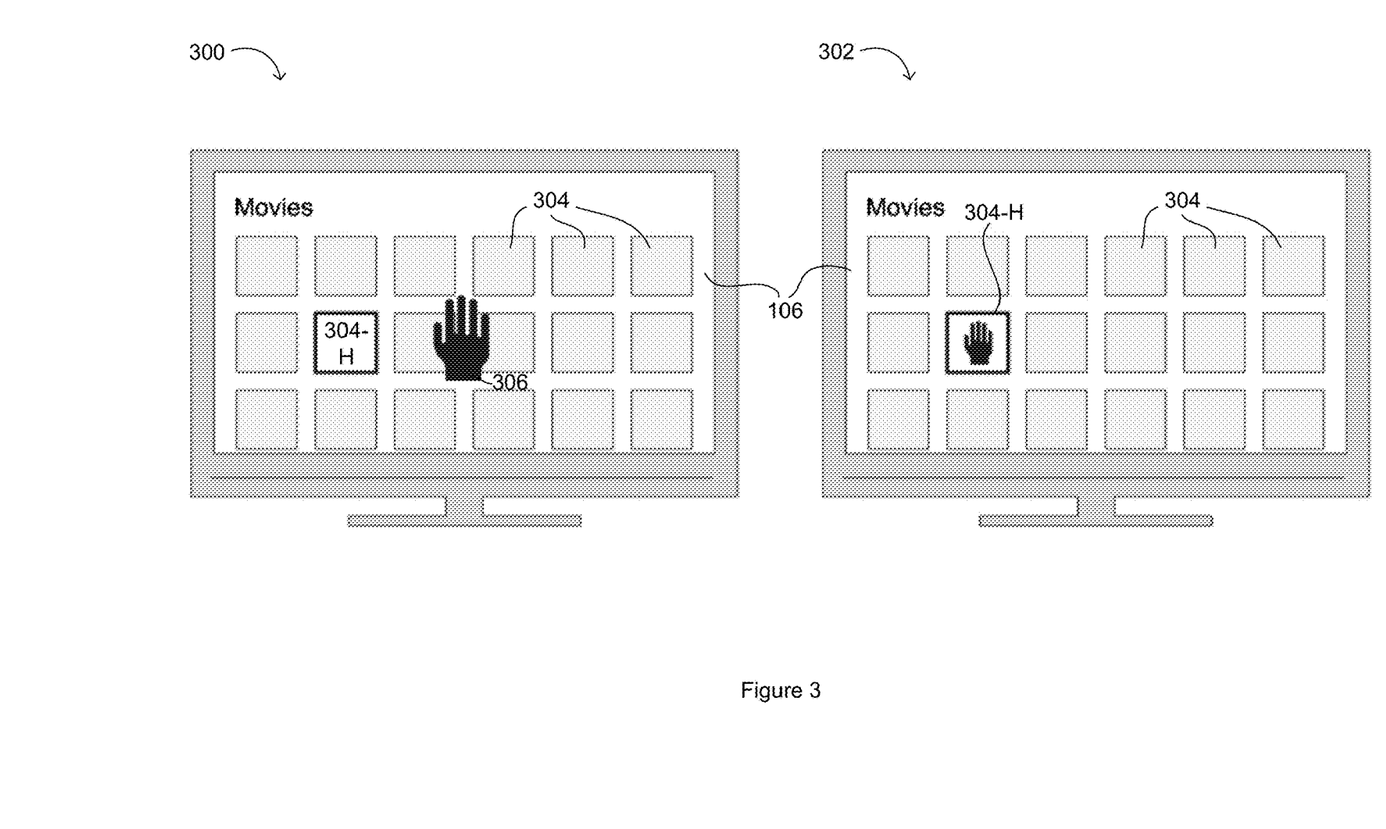
FIG. 3 depicts example feedback position relative to screen, and example feedback position relative to a highlighted object.

Referring now to FIG. 3, shown is an example of feedback position relative to screen, and example feedback position relative to a highlighted object. In 300, an example of feedback position relative to display screen 106 is shown. Here, hand representation 306, which may be representative of a hand or user input device position, is mapped to the full screen space of display 106. Thus, visual feedback is provided based on current hand/device position (and the camera field of view) as related to the full screen space, independent of highlighted object 304-H. However, this approach may not be suitable for highlight-driven user interfaces that may not support free-space positioning.

In particular embodiments, a visual feedback technique for directional input whereby a mapping hand/device position is associated with a current highlight. As shown in example 302, the visual feedback (e.g., a hand representation) may be coupled to the current highlight (e.g., 304-H, but can be anywhere on the screen), as opposed to visually mapping hand/device position to the whole screen space. Thus, a gesture may be referenced from whatever area on or subset of the screen is highlighted (e.g., highlighted object 304-H from among other objects 304). Further, because the range of motion is relatively small as compared to movement related to full-screen display 106 (e.g., example 300), increased selectivity and control may be realized.

Objects or tiles 304 may be arranged in an array or a "strand" of such objects. Each object may represent a media item, including audio and/or video content. Objects 304 can be navigated by using a highlight (e.g., highlighted object 304-H). Once highlighted, an object can be selected (e.g., for playback) by use of a predetermined selection gesture. For example, a grab or grasp gesture 214 may be used, but any suitable gesture can be so designated (e.g., hovering over the highlighted object for at least a predetermined time, etc.). Thus, a user's recognized gesture resulting in a hand representation on display 106 may be mapped to a highlighted tile/object 304 (e.g., 304-H).

For example, the "pointer" that provides visual feedback to the user may look like a hand to indicate that hand gestures are controlling the user interface. Of course, other graphical representations may be used in addition, or alternatively, to such a hand representation. In any event, particular embodiments provide for sequential or adjacent navigation by way of highlighting one object 304 at a time. As discussed above, an invisible circle or circles (e.g., concentric rings 208 and 210) around the highlighted item may represent thresholds. If a gesture is detected to cross a threshold, the next box or object correlated to the directional position of the gesture may instead be highlighted. In this way, a highlight may move from one object to an adjacent object based on gesture-based navigation.

Figure 4:
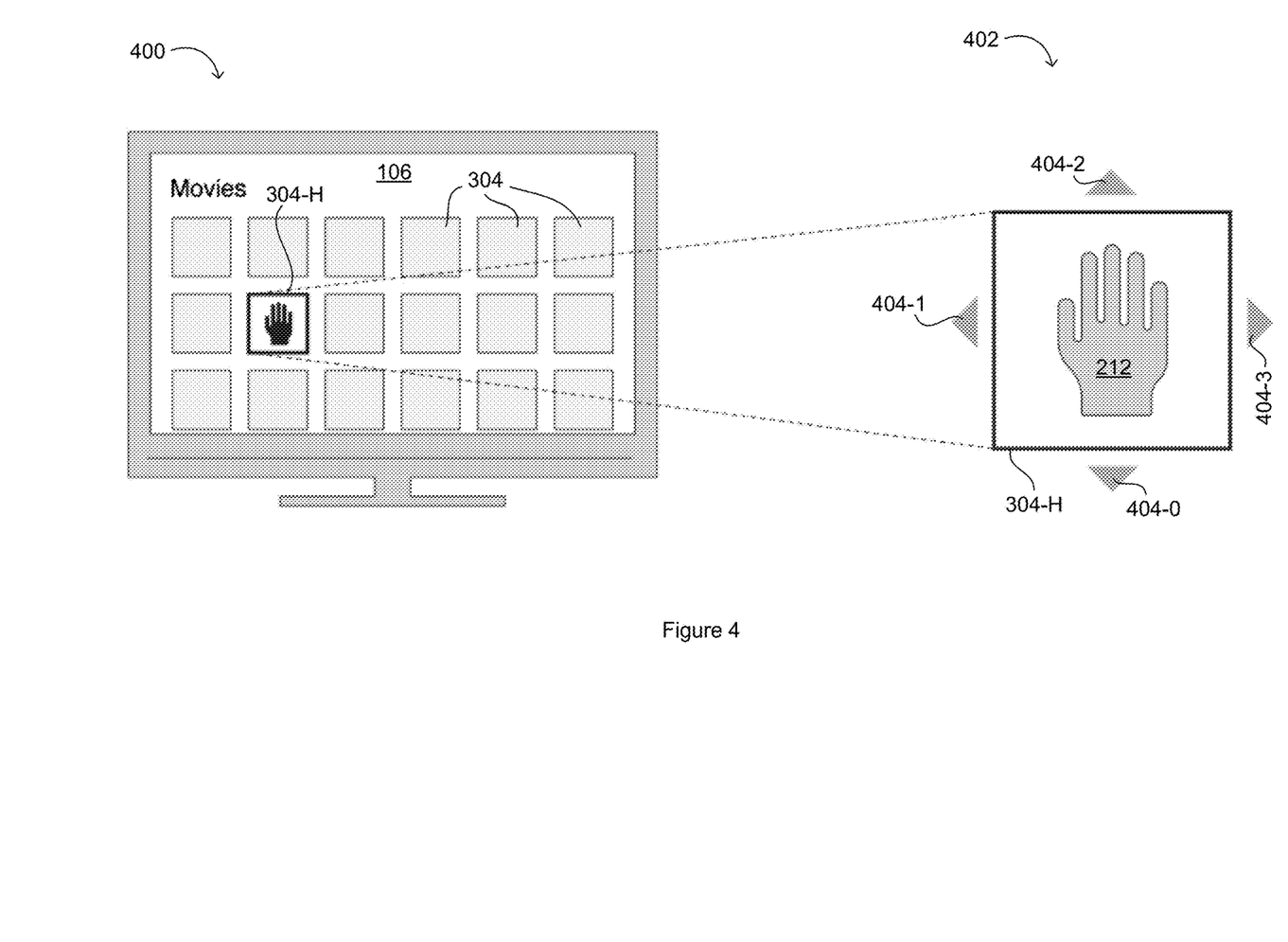
FIG. 4 depicts an example object highlighting that indicates hand position and possible directional actions.

Referring now to FIG. 4, shown is an example object highlighting that indicates hand position and possible directional actions. As shown in 400, display 106 may include objects 304 with a highlighted object 304-H, and close-up view 402 shows an example of possible associated actions. In example 402, the highlight itself can show not only the visual gesture feedback (e.g., hand representation 212), but also possible actions, such as directional position actions 404.

Examples of such directional position actions can include a down direction 404-0, a left direction 404-1, an up direction 404-2, and a right direction 404-3. Of course, other such directional position actions (e.g., diagonals, 3D indicators, etc.) can also be accommodated in particular embodiments. These directional positions may indicate an amount of movement that can trigger action (e.g., moving a highlight) from a current highlighted object (e.g., 304-H) to an adjacent tile/object. When a hand gesture that crosses a threshold (e.g., ring 208) and activates a directional movement indicator 404 is recognized, the visual feedback may so indicate by moving the hand representation 212 outside of the highlighted tile/object.

In particular embodiments, the gestures may be gestures in free space, rather than utilizing a user input device. For example, hardware can include camera 104 (e.g., a web cam), with visual recognition software (e.g., executed on processor 108) that can detect where the hand of user 110 is located. Other approaches may utilize a laser array to detect 3-D depth, and the camera can analyze the image and map to various joints in the body (e.g., hand position, had position, etc.).

Thus, particular embodiments provide a highlight-driven user interface navigable by moving a highlight from element to element (e.g., movie objects 304). Also, an initial or default highlight position may be chosen by the system prior to gesture recognition. For example, object that was highlighted the last time the system was accessed may be maintained the next time display screen 106 displays the strand (e.g., movies 304). Alternatively, a predetermined highlighted object, such as a center most object on the display screen, may initially be chosen prior to gesture recognition. In any event, particular embodiments allow for the initial or default highlight, as well as subsequent highlights to be moved and controlled by hand gestures.

Figure 5:
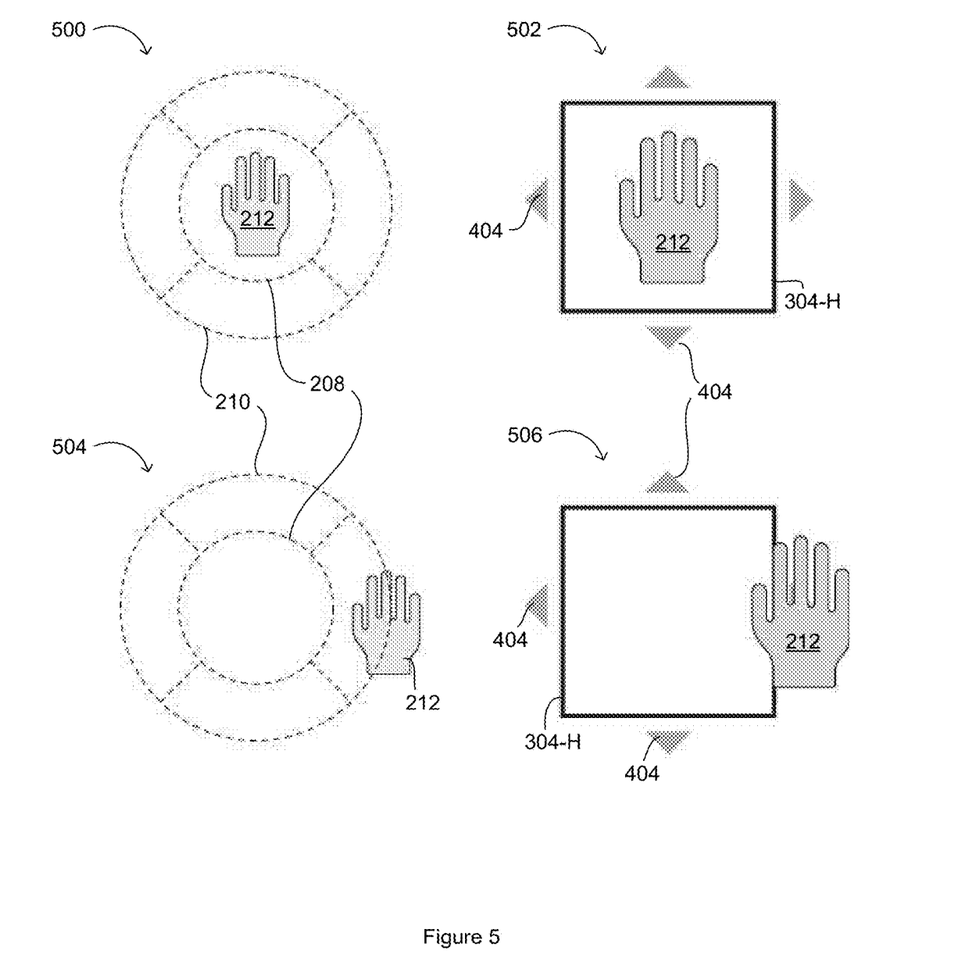
FIG. 5 depicts example dynamically updated visual feedback indicating detected hand positions.

Referring now to FIG. 5, shown is an example of dynamically updated visual feedback indicating detected hand positions. In 500, example neutral position recognition is shown as hand 212 being inside concentric rings 208 and 210. An example highlighted object 304-H with directional action indicators 404 is shown in 502, as a corresponding visual feedback of a neutral position recognition reference to a highlighted object.

In particular embodiments, the visual feedback on the detected gesture may be updated dynamically. As shown in example 504, a user's hand may be detected as crossing outer concentric ring/threshold 210. Visual feedback for this detected gesture may be provided as shown in example 506, whereby hand representation 212 is shown as being on top of right direction representation 404 (e.g., 404-3). Thus in particular embodiments, highlight-driven user interfaces may be augmented with gesture recognition and corresponding visual feedback.

In particular embodiments, movement of the highlight from one object to another can be determined by using recognized gestures relative to the size of the highlight box, as opposed to being relative to the size of the display screen. Thus, movement may be determined by using the directional position of the gesture input, the neutral position, and a dimension of the highlight itself. In this way, sensitivity and accuracy of the gesture detection and user precision and control can be improved as compared to full screen based gesture references.

Highlight-driven user interfaces may be considered more suitable for a "lean-back experience" in the living room, such as for navigating television program. In addition, input noise may have less of an effect on the visual feedback because the range of movement is much smaller than with a mapping position to the full screen (as discussed with reference to example 300 above). Visual feedback may thus be associated with the highlighted object in the user interface, as opposed to the whole display area, resulting in a substantially unambiguous relationship between input actions and visual behavior.

Continuous movement of a user's hand may not dictate the speed of the highlight movement, but rather the position of the hand may control the movement. If a user moves a hand in a directional position that does not correspond directly to one of 404-0, 404-1, 404-2, or 404-3, computing device 102 may determine a closest position. For example (see, e.g., example 402), hand movement that is between two directional action indicators (e.g., 404-2 and 404-3) may be resolved to correlate to a closest of 404-2 or 404-3. Weighting factors may also be employed such that a next most clockwise directional position is favored, such as 404-3 being favored over 404-2 when the directional position is exactly between the two. Alternatively, for such cases where the hand movement is between two directional action indicators, the gesture may be ignored and no associated highlight movement may occur.

As shown in the example of FIG. 5, only when the cursor crosses a threshold (e.g., ring 208, or rings 208/210) does the highlight movement occur in a direction that correlates to the directional position of the recognized gesture. Also, center point of the person or user for the gesture detection depends on the particular hardware used. For example, the center point can include the person's face, a predetermined center point relative to the television or display screen 106, and/or horizontal line across the shoulders, hips, legs, etc., of the user. In some cases, the entire body may be recognized, and hand position may just be one of many things that can be detected as a gesture. In any event, a reference point for gesture recognition may be predetermined, and may include a part of a body or a center point of a visual map of the camera range.

Particular embodiments may support both a re-centering of the hand for gesture recognition, as well as an absolute relationship relative to hand position. For example, the hand may be re-centered once a highlight is moved after detection of an appropriate move gesture. In this case, the hand may then be moved again from that neutral position in order to control further highlight movement. Alternatively, an absolute relationship relative to hand position may be accommodated whereby as long as the user's hand remained in, e.g., the right directional position, adjacent boxes or objects may be highlighted in continuous sequential fashion. Further, due to limited space in a typical living room, such an absolute relationship may be desirable for ease of hand gesture recognition-based navigation.

Figure 6:
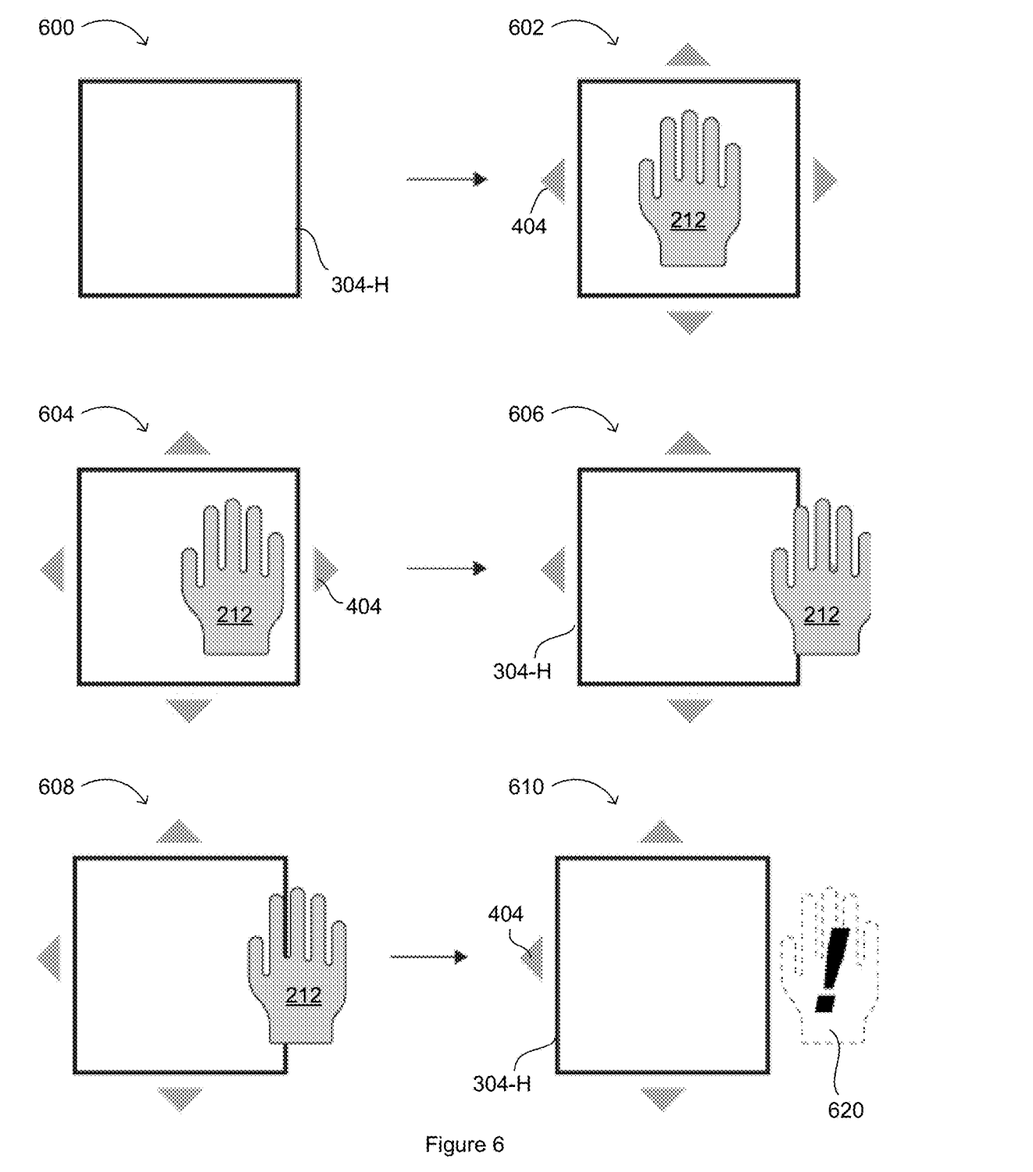
FIG. 6 depicts example directional input and hand input error feedback types.

Referring now to FIG. 6, shown is an example of directional input and hand input error feedback types. Depending on the detected or recognized gesture input, corresponding visual feedback with reference to the presently highlighted object may be provided to the user. In example 600, highlighted object 304-H is shown, and in example 602, visual feedback indicating detection of a neutral position is shown. This neutral position detection feedback may be indicated as hand representation 212 centered in highlighted object 304-H, and including directional action indicators 404 surrounding the highlighted object.

In example 604, recognition of a motion of a user's hand to the right may be indicated as shown by hand representation 212 being position slightly to the right of center. However, this hand motion may not reach an appropriate threshold or concentric ring (e.g., 208/210) in order to result in movement of the highlight from a present object to the adjacent object on the right side. In example 606, gesture hand movement to the right may be detected as sufficient to move the highlight, and this visual feedback may be presented as hand representation 212 over the right side directional action indicator (e.g., 404-3).

In example 608, the visual feedback as referenced to highlighted object 304-H may also indicate that the users hand gesture is recognized as selecting a highlight movement to the right. However, in example 610, the visual feedback may indicate that the user's hand has been moved too far to the right, and maybe out of the field of view of camera 104. For example, this may be indicated by a dashed hand representation with an error warning as shown in 620. Of course, other suitable types of feedback (e.g., other graphical representations, audio alarms, flashing or strobe representations, etc.) for such input errors can also be employed in particular embodiments.

Figure 7:
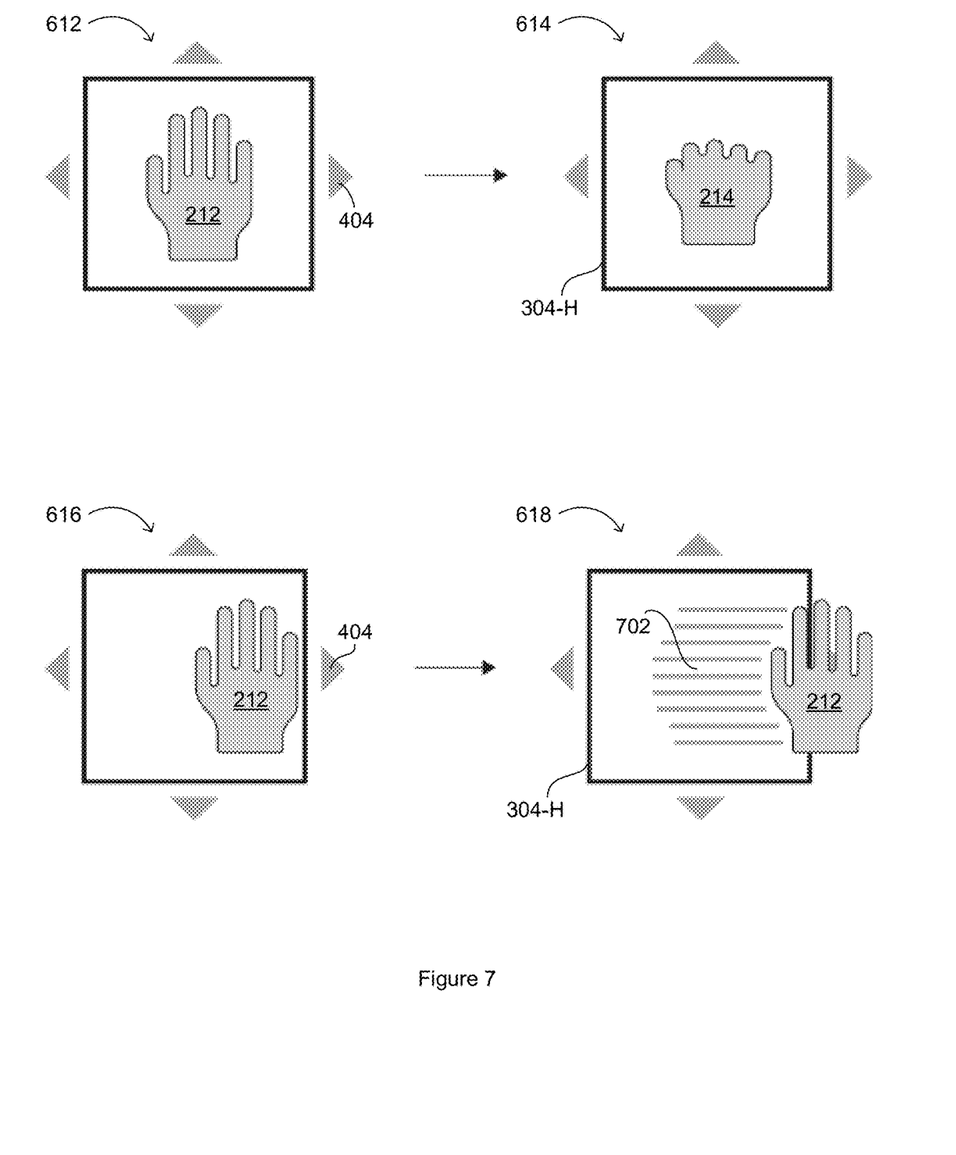
FIG. 7 depicts example hand state and other gesture feedback types.

Referring now to FIG. 7, shown is an example of hand state and other gesture feedback types. In example 612, the visual feedback may indicate recognition of a flat hand state by way of hand representation 212. In example 614, the visual feedback may indicate recognition of a grasp/grab hand state in hand representation 214. Other gesture recognition examples are shown in 616 and 618. For example, a hand swipe gesture can be recognized for a hand movement from center to right, and a swipe visual feedback indicator may be as shown as 702. In this way, feedback can be provided for various gesture detection, such as input, directional input (e.g., direction and distance from center), hand input error (e.g., out of camera field of view, hand state (flat, grasp, etc.), and other gestures (e.g., swipe).

In one embodiment, a method of controlling a highlight-driven user interface can include: indicating a highlight of a first object on a display screen, where the first object is one of a plurality of objects displayed on the display screen; accepting, by a computing device, a signal deriving from a first gesture input of a user, where the first gesture input indicates a neutral position relative to the highlighted first object on the display screen; accepting, by the computing device, a signal from the user input device, the signal deriving from a second gesture input of the user, where the second gesture input indicates a directional position that is at least a predetermined distance from the neutral position; and indicating, in response to the second gesture input, a movement of the highlight from the first object to a second object, where the second object is adjacent to the first object in the plurality of objects on the display screen, and where the directional position of the second gesture input correlates to a position on the display screen of the second object relative to the first object.

Figure 8:
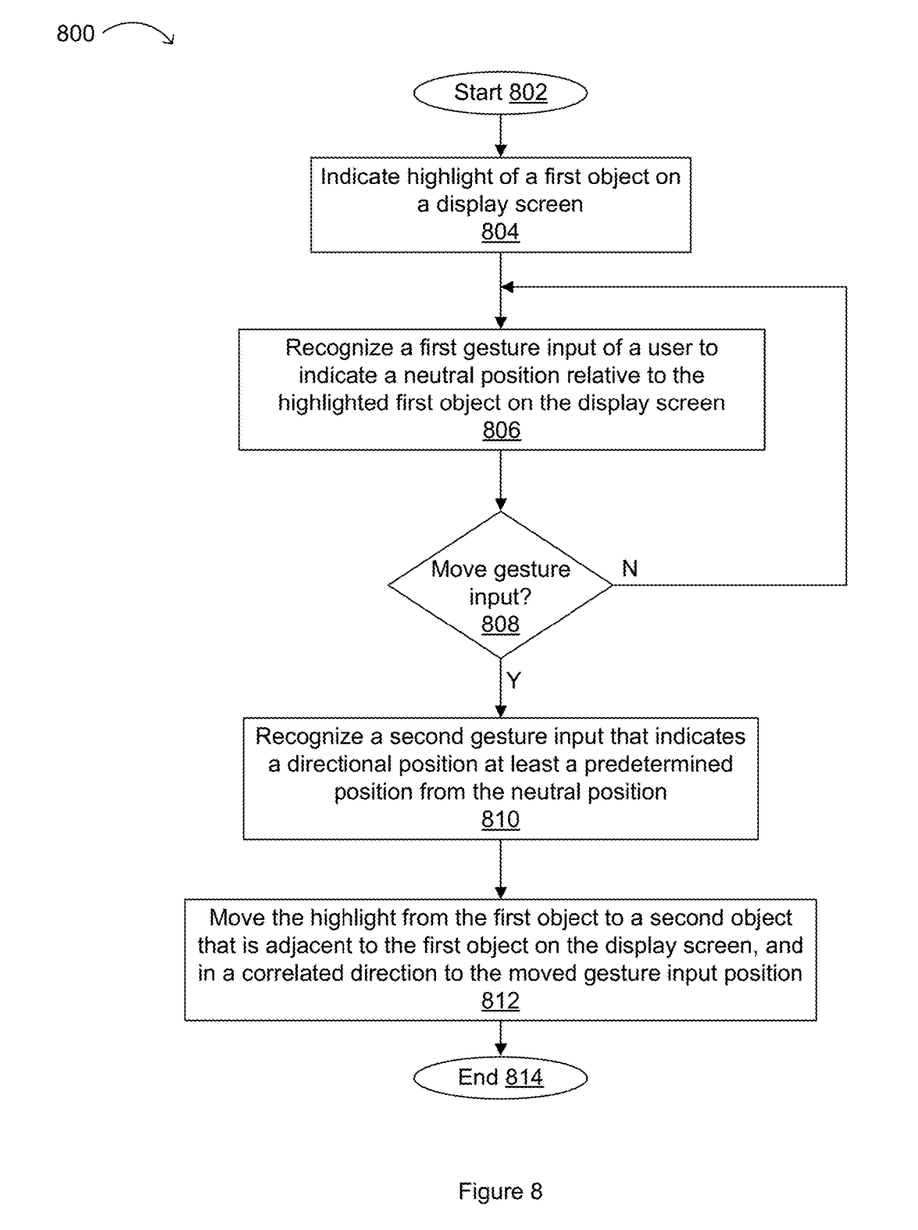
FIG. 8 is a flow diagram of an example method of controlling a highlight-driven user interface.

Referring now to FIG. 8, shown is a flow diagram 800 of an example method of controlling a highlight-driven user interface. The flow may begin 802, and at 804 a highlight of a first object may be indicated on a display screen. For example, an object representing media content 304-H may be indicated on display screen 106. This particular object may be chosen for initial highlighting as a default setting (e.g., a most recently highlighted object, a center-most object on the display screen, etc.).

At 806, a first gesture input of a user may be recognized to indicate a neutral position. The neutral position may be relative to the highlighted first object on the display screen. For example, computing device 102 may accept a signal deriving from the first gesture input (e.g., by way of camera 104 and processor 108). This first gesture input, which may include a user hand held flat and up in a neutral position, may be indicated as recognized via visual feedback (e.g., 402) in association with highlighted object 304-H. In addition, an initialization procedure can occur prior to recognition of the first gesture input, and may include the user forming an infinity or FIG. 8 pattern with his hand.

At 808, a determination can be made as to whether any move gesture is occurring. If there is no move gesture input (e.g., the user walks away, gives an initialization signal, etc.), the flow can return to await recognition of the first gesture input of a neutral position. However, at 810 a second gesture input that indicates a directional position that is at least a predetermined distance from the neutral position may be recognized. For example, computing device 102 may accept a signal deriving from the second gesture input (e.g., by way of camera 104 and processor 108). This gesture input may indicate a directional position that is at least a predetermined distance from the neutral position. For example, the second gesture input may be the user moving his hand to the left, right, up, or down, at least as far as inner threshold/ring 208.

At 812, the highlight can be moved from the first object to a second object that is adjacent to the first object on the display screen, and the flow can complete at 814. The directional position of the second gesture input may correlate to a position on the display screen of the second object relative to the first object. For example, if the second gesture input is recognized as a hand movement to the right, the second object that is highlighted as a result may be the adjacent object to the right of the first object. Similarly, if the second gesture input is recognized as a hand movement in the up direction, the second object that is highlighted as a result may be the adjacent object immediately above the first object.

Also, as discussed above, particular embodiments may accommodate gestures for selection of a highlighted object, such as grasp gesture 214. Further, various visual feedback, such as those in association with a highlighted object, may be provided to indicate to the user which gesture has been recognized by computing device 102. Some examples of such feedback were discussed above with reference to FIGS. 6 and 7.

In this way, gesture input may be used to control a highlight-driven user interface. Although the description has been described with respect to particular embodiments thereof, these particular embodiments are merely illustrative, and not restrictive. For example, the approach described herein may be utilized with (e.g., PS Move) or without user input devices. In other words, the camera-based gesture recognition of particular embodiments may not require that users actually hold a physical device.

In addition, particular embodiments are suitable for applications (e.g. selection/arrangement of objects) in 2D or 3D space. For example, a 3D display of objects can be navigated by the hand gestures as described herein for two dimensions, plus additional gestures (e.g., pushing a hand closer to the display screen, pulling the hand farther from the display screen, etc.) in order to navigate the highlight among objects in the third dimension.

Further, particular embodiments are suitable for one or more users. As an example of a multiuser application, different highlight indications can be applied for different users (e.g., a red highlight for Bob, a blue highlight for Bill, etc.), and/or different subsets of objects may be navigable by different users (e.g., a minor may not be able to navigate movie content that is rated R). Support for different users may also accommodate Internet-based access of the objects, including those where a remote user is accessing an object using hand gestures.

Particular embodiments may also accommodate other complex gestures, such as multistep or multi-gesture recognition (e.g., where several gestures form one navigation command). Further, visual feedback can either be associated with the current highlight on the display screen, or may occur in a separate area (e.g., a corner, a menu bar, etc.) of the screen.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method of controlling a user interface, the method comprising:

highlighting a first object on a display screen, wherein the first object is one of a plurality of objects displayed on the display screen;

accepting, by a computing device, a signal deriving from a first gesture input of a user, wherein the first gesture input, provided by a body part of the user without making any direct contact with the display screen, indicates a neutral position of the body part relative to the highlighted first object on the display screen;

providing on the display screen, in response to the first gesture input of the user, a graphical representation at a first position, the first position having a predetermined relationship with the position of the highlighted first object;

accepting, by the computing device, a signal deriving from a second gesture input of the user, wherein the second gesture input, caused by movement of the body part through a gesture distance from the neutral position along a gesture direction from the neutral position, indicates a directional position;

moving the graphical representation, in response to the second gesture input, to a second position on the display screen indicative of the directional position;

detecting whether the movement of the graphical representation to the second position crosses a circular ring threshold, centered at the neutral position corresponding to the screen position of the highlighted first object and characterized by a predetermined radius, the circular ring threshold being independent of positioning of any of the plurality of objects other than the highlighted first object; and in response to detecting that the movement of the graphical representation to the second position does cross the circular ring threshold at a point on the display screen between the first object and a second object adjacent to the first object in the plurality of objects, highlighting the second object, wherein the directional position of the second gesture input correlates to a position on the display screen of the second object relative to the first object.

2. The method of claim 1, wherein the highlight comprises a dimension, the method further comprising:

determining the movement of the highlight by using at least the directional position, the neutral position, and the dimension of the highlight.

3. The method of claim 1, further comprising:

accepting, by the computing device a signal deriving from a third gesture input of the user, wherein the third gesture input indicates selection of the highlighted second object.

4. The method of claim 3, wherein the third gesture input comprises a hand of the user in a grasp state.

5. The method of claim 1, wherein the first gesture input comprises a hand of the user in a flat upright state.

6. The method of claim 5, wherein the second gesture input comprises the flat upright state hand of the user being moved according to the directional position.

7. The method of claim 1, further comprising:

performing an initialization procedure prior to accepting the signal deriving from the first gesture input of the user.

8. The method of claim 1, wherein each of the plurality of objects represents media content that is playable on the display screen.

9. The method of claim 1, wherein:

the movement of the highlight is performed at a first predetermined speed if the directional position lies between inner and outer concentric rings envisaged around the neutral position; and the movement of the highlight is performed at a second predetermined speed if the directional position exceeds the outer concentric ring, wherein the second predetermined speed is greater than the first predetermined speed.

10. An apparatus configured to control a user interface, the apparatus comprising:
one or more processors; and
a computer-readable non-transitory storage medium having one or more instructions stored thereon for execution by the one or more processors, and when executed being operable to perform:
highlighting a first object on a display screen, wherein the first object is one of a plurality of objects displayed on the display screen;
accepting, by a computing device, a signal deriving from a first gesture input of a user, wherein the first gesture input, provided by a body part of the user without making any direct contact with the display screen, indicates a neutral position of the body part relative to the highlighted first object on the display screen;
providing on the display screen, in response to the first gesture input of the user, a graphical representation at a first position coupled to the highlighted first object;
accepting, by the computing device, a signal deriving from a second gesture input of the user, wherein the second gesture input, caused by movement of the body part through a gesture distance from the neutral position along a gesture direction from the neutral position, indicates a directional position;
moving the graphical representation, in response to the second gesture input, to a second position on the display screen indicative of the directional position;
detecting whether the movement of the graphical representation to the second position crosses a circular ring threshold, centered at the neutral position corresponding to the screen position of the highlighted first object, and characterized by a predetermined radius, the circular ring threshold being independent of positioning of any of the plurality of objects other than the highlighted first object; and
in response to detecting that the movement of the graphical representation to the second position does cross the circular ring threshold at a point on the display screen between the first object and a second object adjacent to the first object in the plurality of objects, highlighting the second object, wherein the directional position of the second gesture input correlates to a position on the display screen of the second object relative to the first object.

11. The apparatus of claim 10, wherein the highlight comprises a dimension, the one or more instructions when executed being further operable to perform:
determining the movement of the highlight by using at least the directional position, the neutral position, and the dimension of the highlight.

12. The apparatus of claim 10, the one or more instructions when executed being further operable to perform:
accepting, by the computing device, a signal deriving from a third gesture input of the user, wherein the third gesture input indicates selection of the highlighted second object.

13. The apparatus of claim 12, wherein the third gesture input comprises a hand of the user in a grasp state.

14. The apparatus of claim 10, wherein the first gesture input comprises a hand of the user in a flat upright state, and wherein the second gesture input comprises the flat upright state hand of the user being moved according to the directional position.

15. The apparatus of claim 10, the one or more instructions when executed being further operable to perform:
performing an initialization procedure prior to accepting the signal deriving from the first gesture input of the user.

16. The apparatus of claim 10, wherein each of the plurality of objects represents media content that is playable on the display screen.

17. The apparatus of claim 1, wherein:
the movement of the highlight is performed at a first predetermined speed if the directional position lies between inner and outer concentric rings envisaged around the neutral position; and
the movement of the highlight is performed at a second predetermined speed if the directional position exceeds the outer concentric ring, wherein the second predetermined speed is greater than the first predetermined speed.

18. A system for controlling a user interface, the system comprising:
means for indicating a highlight of a first object on a display screen, wherein the first object is one of a plurality of objects displayed on the display screen;
means for accepting, by a computing device, a signal deriving from a first gesture input of a user, wherein the first gesture input, provided by a body part of the user without making any direct contact with the display screen, indicates a neutral position of the body part relative to the highlighted first object on the display screen;
means for providing on the display screen, in response to the first gesture input of the user, a graphical representation at a first position coupled to the highlighted first object;
means for accepting, by the computing device, a signal deriving from a second gesture input of the user, wherein the second gesture input, caused by movement of the body part through a gesture distance from the neutral position along a gesture direction from the neutral position, indicates a directional position;
means for moving the graphical representation, in response to the second gesture input, to a second position on the display screen indicative of the directional;
means for detecting whether the movement of the graphical representation to the second position crosses a circular ring threshold, centered at the neutral position corresponding to the screen position of the highlighted first object, and characterized by a predetermined radius, the circular ring threshold being independent of positioning of any of the plurality of objects other than the highlighted first object; and
means for highlighting, in response to detecting that the movement of the graphical representation to the second position does cross the circular ring threshold at a point on the display screen between the first object and a second object adjacent to the first object in the plurality of objects, wherein the directional position of the second gesture input correlates to a position on the display screen of the second object relative to the first object.

* * * * *